Aug. 9, 1949.  E. P. TURNER  2,478,551
DYNAMOELECTRIC MACHINE
Filed April 23, 1945  2 Sheets-Sheet 1

Inventor
Edgar P. Turner
Witness:
Godfrey Pecina
By William F. Stewart
Attorney

Aug. 9, 1949.   E. P. TURNER   2,478,551
DYNAMOELECTRIC MACHINE
Filed April 23, 1945   2 Sheets-Sheet 2

Witness:
Godfrey Pecina

Inventor
Edgar P. Turner
By William V. Stewart
Attorney

Patented Aug. 9, 1949

2,478,551

UNITED STATES PATENT OFFICE 2,478,551

DYNAMOELECTRIC MACHINE

Edgar P. Turner, Fanwood, N. J., assignor to The Singer Manufacturing Company, Elizabeth, N. J., a corporation of New Jersey Application April 23, 1945, Serial No. 589,778

8 Claims. (Cl. 171—252)

This invention relates to dynamoelectric machines and more particularly to small electric motors of fractional horsepower size adapted to furnish the driving power for sewing machines, typewriters, fans and similar apparatus.

These motors are produced in large quantities in a highly competitive market, and any simplification of construction or assembly, is magnified by the great number of units involved and may become a factor of primary importance in the commercial success of the product.

Heretofore, in the assembly of motors of this type, it has been necessary to employ a critically close fit between the stator core and the stator case to insure satisfactory bearing alignment. This condition resulted in practically a selective fit, requiring much assembly time and defeating the advantages of interchangeability of parts. This is particularly true of motor cases made of synthetic molded plastic materials, which materials are susceptible to dimensional change due to temperature and pressure effects.

It is, therefore, an object of this invention to provide an improved dynamoelectric machine construction which shall successfully employ inexpensive molded parts to hold a stator securely to avoid vibration, and have the advantage of providing consistently good bearing and air-gap alignment without the disadvantage of critical fits during assembly.

This has been attained by a novel motor case and core assembly in which the act of drawing two molded end-covers together longitudinally causes a finished surface of a magnetic core therewithin to be radially forced against accurately matching surfaces located on the interior of said end-covers.

With the above and other objects in view, as will hereinafter appear, the invention comprises the devices, combinations, and arrangements of parts hereinafter set forth and illustrated in the accompanying drawings of a preferred embodiment of the invention from which the several features thereof and the advantages attained thereby will be readily understood by those skilled in the art.

Figure 1:
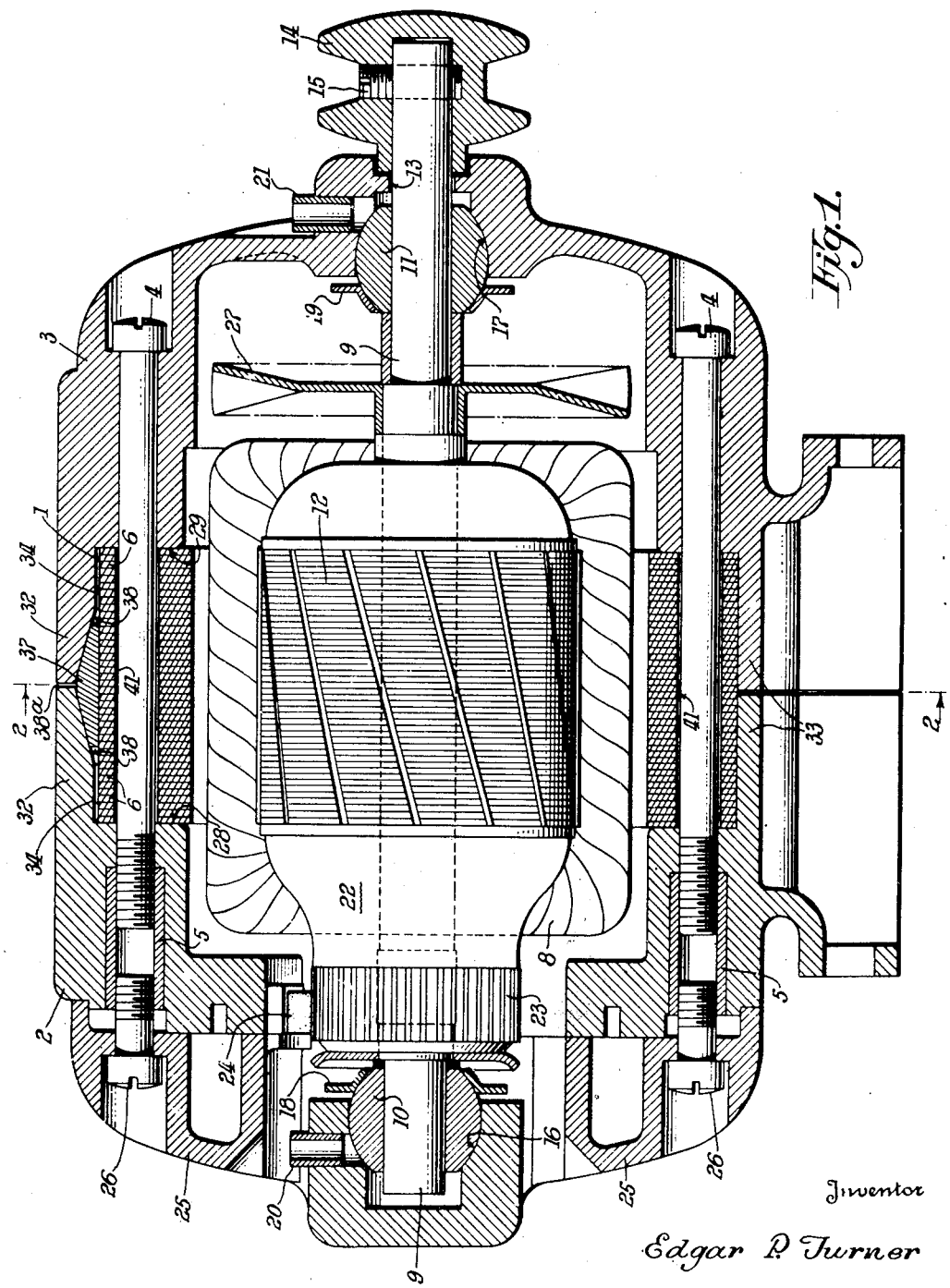
Figure 2:
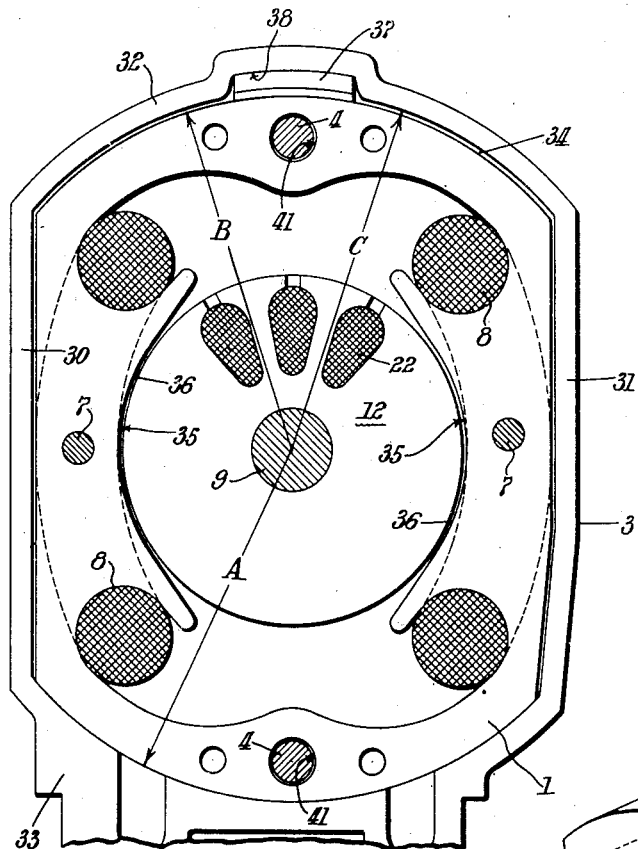
Figure 3:
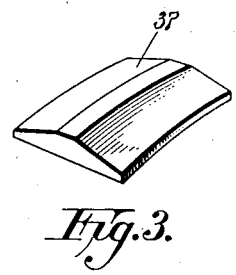
Figure 4:
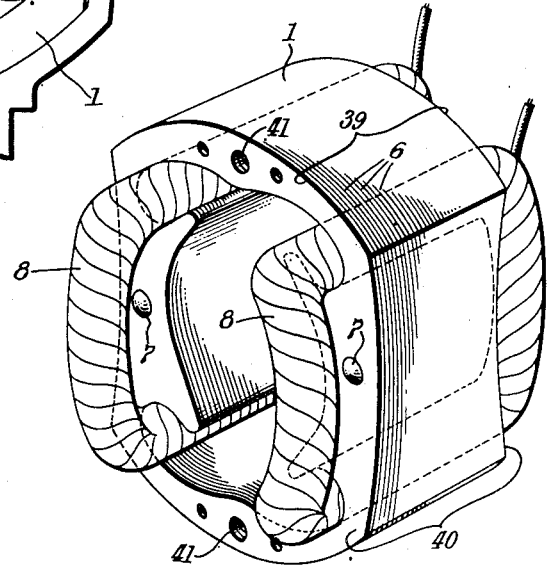
Figure 5:
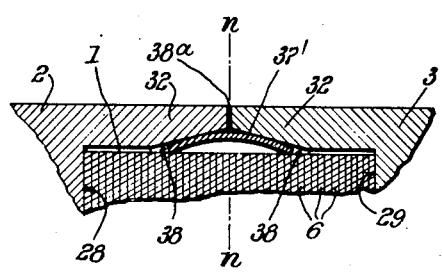

In the accompanying drawings, Fig. 1 is a longitudinal vertical section, partly in elevation, of an electric motor embodying the invention. Fig. 2 is a sectional elevational view taken substantially on the line 2—2 of Fig. 1. Fig. 3 is a detail perspective view of a part used in assembling the motor of Fig. 1. Fig. 4 is a perspective view of a stator core assembly for the motor of Fig. 1. Fig. 5 is a fragmentary sectional view showing a modified wedge.

The motor is constructed with a stator core 1 positioned between end-covers 2 and 3, preferably of molded insulation material, by means of screws 4 which extend longitudinally through the parts and are threaded into bushings 5—5, preferably of metal and removably carried in recesses in the end-cover 2. The stator core 1 is made up of thin stacked magnetic laminations 6 held together generally by rivets 7 and carries current-conducting windings 8 thereon, as is well known in the art. A shaft 9 journaled in self-aligning bearings 10 and 11 carries a rotor core 12 which is disposed for rotation in the usual manner within the stator core 1. The shaft 9 extends through an aperture 13 in the end-cover 3 and has a power take-off pulley 14 secured to its outer end by means of screw 15.

The bearings 10 and 11 are held within spherical seats 16 and 17, respectively in end-covers 2 and 3 by spring retainers 18 and 19. This bearing construction forms the subject matter of my copending application Serial No. 589,779, filed April 23, 1945, now issued as Patent Number 2,448,500 on August 31, 1948, to which reference may be had for a more complete description thereof.

Small nipples 20 and 21 pressed into suitable ducts within the perspective end-covers give access to the bearings 10 and 11 for applying lubricating oil thereto.

The rotor core 12 carries the usual current-conducting winding 22 connected to commutator 23 in the conventional manner.

Brushes, as 24, bear against diametrically opposite portions of the commutator 23 to permit transfer thereto of current from an external supply circuit, as is well known in the art. Removable brush covers 25—25, held in place by screws 26—26, threaded into the bushings 5—5, give access to the brushes for examination and/or replacement thereof. For a more complete description of this brush structure, reference may be had to the copending application Serial No. 589,846, Reynold Happe, filed April 23, 1945, now issued as Patent Number 2,444,826 on July 6, 1948.

A fan 27 pressed onto a portion of the shaft 9 rotates therewith to cause ventilating air to be circulated longitudinally through the motor, as is customary with motors of this type.

According to the present invention, the end-covers 2 and 3 are formed with recessed portions generally shaped to conform to and receive the stator core 1 in engagement therewith and preferably against the abutment portions 28 and 29 thereof as shown in Fig. 1. This shape is such as to provide on each end-cover substantially straight and parallel wall portions 30 and 31 and diametrically opposed cylindrical wall portions 32 and 33 as seen best in Fig. 2. The inside radius A of the wall portion 33 is made substantially equal to the finished outside radius B of the stator core 1; while the inside radius C of the wall portion 32 is made approximately .010 inch larger than the finished outside radius B of the stator core which is approximately 1⅜ inches. It will be noted that said wall portions 32 and 33 of each end-cover are molded in precise coaxial relation to the bearing-receiving seats 16 and 17 respectively. The result of this dimensional arrangement is that, with the stator core convex cylindrical outer surface pressed radially against the concave cylindrical inner surface of wall portions 33, there results a substantial radial clearance space 34 between the stator core and the wall portions 32 which space contributes very materially to the easy initial interfitting of the parts and the quick and simple assembly resulting therefrom. This clearance space 34 is purposely shown in exaggerated form in Figs. 1 and 2 to clearly bring out this important feature of the invention. It will be seen that, with the external cylindrical stator-core surface in contiguous relation with the inside surfaces of the wall portions 33 as shown in Figs. 1 and 2, the spherical bearing-receiving seats 16 and 17 are located in precise coaxial alignment with the bore 35 of the stator core. Since the rotor core diameter has been finished concentric with the axis of the shaft 9 and since the stator core outside and inside diameters have been finished from a common axis in accordance with regular accepted motor manufacturing procedure, it follows that the rotor core finds itself in coaxial position within the stator bore and forms therewith a symmetrical air-gap 36 so important in producing quiet and efficient motor operation.

It has been found that adequate accuracy of alignment is readily obtainable by this invention without the necessity of finishing any of the receiving surfaces of the end-covers. The time- and material-saving advantage of assembling the end-covers in a substantially as-molded condition is obvious.

In order to insure that the stator core is securely seated against the inside surface of the wall portions 33 of the end covers, a wedge 37, Fig. 3, preferably made of molded insulating material, is employed to apply the proper radial reaction force between the stator core and the end covers to drive the parts into this desired relation when assembled. The wall portion 32 of each end-cover is formed with a central wedge-shaped recess having an axially-disposed inclined face portion 38. During assembly, the two end-covers 2 and 3, are positioned in open face-to-face relation so as to enclose the stator core 1 in clamped engagement therebetween and to bring the wedge-shaped recesses into open-end alignment to form with the stator core an enclosure within which is located the wedge 37. As the end-covers 2 and 3 are forced longitudinally closer together during assembly by the clamping action of the screws 4, the wedge 37 is given a radial force component due to the inclined plane action of surface 38, which drives the stator core 1 into secure seated engagement with the inside surface of wall portions 33.

To further assure a snug, vibrationless fit of the stator core within the assembled molded end-covers, the stator core laminations are purposely drawn up tightly at their central portions by the rivets 7 and allowed to spread out longitudinally of said core along the cylindrical edge portions 39 and 40. The stator core is thus provided with a longitudinal resiliency at the edges which allows said core to conform more readily at its ends to the abutment portions 28 and 29 respectively, thus utilizing the full peripheral area of said parts for support.

While I have shown, in the final assembled condition, the stator core 1 clamped between the abutment portions 28 and 29, it is to be understood that this invention also includes within its scope the slightly modified assembly in which the core 1 relies solely on the clamping action of the wedge 37 for longitudinal positioning and so does not require the core 1 to seat against said abutment portions 28 and 29.

There is also a radial resiliency provided by the natural yielding of the wall portions, 32 and 33 of the end-covers. This greatly assists in firmly holding the stator core by maintaining a radial spring force against the wedge 37. It is also understood that any desired amount of resiliency may be built into the wedge itself by utilizing different shapes and materials. Fig. 5, for example, shows a wedge 37' made by bending a piece of flat spring steel. It has considerable resilience in a direction along the normal $n$—$n$, as shown.

It will be noticed that the screws 4 have a loose fit within holes 41 in the stator core 1 to allow said core to be sufficiently displaced radially relative to the end-covers to seat fully against the inside surface of wall portions 33 of the end-covers as shown.

In assemblying these parts according to the invention, it is merely necessary to (1) insert the stator core 1 into the recess provided in the end-cover 2; (2) insert the wedge 37 so that it lies freely between the recess surface portion 38 of said end-cover and the cylindrical surface of said stator core; (3) apply the second end-cover 3 to the assembly so that the wedge recesses are aligned; and finally, (4) insert screws 4 and tighten same.

From the foregoing it will be perceived that I have provided an improved construction for dynamoelectric machines, which construction allows the practical use of inexpensive molded parts, requires only reasonable care in assembly and results in consistently precise bearing and air-gap alignments.

It will be obvious to those skilled in the art that the invention may, without departure from its essential attributes, be embodied in various specific forms other than that shown and described, which latter is to be considered in all respects as illustrative of the invention and not restrictive.

Having thus set forth the nature of the invention, what I claim herein is:

1. In a dynamoelectric machine, a laminated magnetic stator core having a finished outer peripheral surface, two axially opposed complemental end-covers each of molded insulating material, said end-covers being recessed to receive said core therebetween and having two diametrically opposed inner peripheral surfaces of different radii, a wedge element of molded insulating material positioned between said outer peripheral surface of said core and one of the said inner peripheral surfaces of said end-covers whereby to force said core radially against said other inner peripheral surface when said end-covers are brought together axially to enclose said stator core.

2. A dynamoelectric machine, comprising a stator core having longitudinally resilient outer edge portions, two axially opposed complemental end-covers recessed to receive said core therebetween and having abutment portions, a movable wedge element positioned radially between said core and said end-covers, and means for drawing said end-covers together axially to form a closure for said stator core, whereby said wedge moves to force said parts radially into a predetermined relative position and said resilient edge portions are seated against said abutment portions.

3. A dynamoelectric machine, comprising a stator core having longitudinally resilient outer edge portions, two axially opposed complemental end-covers recessed to receive said core therebetween and formed with abutment portions, and a movable wedge element freely supported between said core and said end-covers, whereby to force said parts radially into a predetermined relative position when said end-covers are brought axially together with the abutment portions thereof in surface contact with the resilient outer edge portions of said core.

4. A dynamoelectric machine, comprising a stator core having a convex cylindrical outer surface, two hollow axially opposed complemental end-covers of molded material, each having two diametrically opposed concave cylindrical inner surfaces of different radii, a wedge element freely movable between said core and said end-covers, and means for drawing said end-covers axially together to form a closure for said stator core, whereby said wedge moves to a fixed position and forces said outer peripheral surface of the core into intimate contact with the inner cylindrical surfaces of smaller radius.

5. A dynamoelectric machine, comprising a magnetic stator core having outer and inner coaxial, cylindrical surfaces, two hollow complemental end-covers of molded material recessed to receive said core therebetween and having a concave cylindrical surface coaxial with bearing-receiving bores therein, and a resilient wedge element movably positioned between the outer surface of said core and said end-covers, whereby endwise movement of said end-covers to clamp said stator core therebetween causes radial movement of said wedge to position said stator core within said end-covers so that said inner cylindrical surface of said core is coaxially aligned with the bearing-receiving bores of said end-covers.

6. In a dynamoelectric machine, two hollow, molded, dielectric end-covers, each formed with an abutment portion and having a recess formed in an outer wall thereof, a magnetic stator core having longitudinally resilient end portions held in position between the abutment portions of said end-covers, said end-covers being positioned with said recesses in open-end alignment to form with said stator core an enclosure having inclined plane walls opposed to said stator core, and a wedge element positioned within said pocket to exert a radial force between said inclined plane walls and said stator core whereby to position said stator core in a predetermined radial position relative to said end-covers and means for securing said parts in this position.

7. In a dynamoelectric machine, hollow end-covers having inclined wall portions, a radially stiff stator core disposed within said end-covers, a radially resilient wedge disposed between said stator core and said end-covers at said inclined wall portions whereby, longitudinal movement towards each other of said end-covers resiliently urges said stator core into a predetermined position relative to said end-covers 8. In a dynamoelectric machine, a stator-core, opposed end-covers internally provided with a stator-core seat and complemental to each other in forming a housing for said stator-core, means constraining said end-covers to move axially toward each other into stator-core housing position, and means rendered effective upon said axial movement of the end-covers for constraining said stator-core to move transversely of the longitudinal axis thereof into engagement with said stator-core seat.

EDGAR P. TURNER.

REFERENCES CITED

The following references are of record in the file of this patent:

UNITED STATES PATENTS

| Number | Name | Date |
| --- | --- | --- |
| Re. 17,128 | Daun | Nov. 6, 1928 |
| 100,303 | Mann | Mar. 1, 1870 |
| 1,140,855 | Shaw | May 25, 1915 |
| 1,446,898 | Gysel | Feb. 27, 1923 |
| 1,477,773 | Schou | Dec. 18, 1923 |
| 1,822,859 | Perkins | Sept. 8, 1931 |
| 2,241,073 | Staak | May 6, 1941 |